US007886330B2

(12) United States Patent
Kikinis

(10) Patent No.: US 7,886,330 B2
(45) Date of Patent: Feb. 8, 2011

(54) ENHANCED HOME ENTERTAINMENT SYSTEM WITH REMOVABLE LONG-TERM STORAGE

(75) Inventor: Dan Kikinis, Saratoga, CA (US)

(73) Assignee: JLB Ventures LLC, Washington, DC (US)

( * ) Notice: Subject to any disclaimer, the term of this patent is extended or adjusted under 35 U.S.C. 154(b) by 809 days.

(21) Appl. No.: 09/875,547

(22) Filed: Jun. 5, 2001

(65) Prior Publication Data

US 2002/0019986 A1 Feb. 14, 2002

(51) Int. Cl.
*G06F 3/00* (2006.01)
*G06F 13/00* (2006.01)
*G06F 13/28* (2006.01)
*H04N 5/445* (2006.01)
*H04N 7/16* (2006.01)

(52) U.S. Cl. ............... 725/142; 725/39; 725/48; 711/100; 711/117

(58) Field of Classification Search .......... 725/134, 725/55
See application file for complete search history.

(56) References Cited

U.S. PATENT DOCUMENTS

| | | | |
|---|---|---|---|
| 4,621,259 A | 11/1986 | Schepers et al. | |
| 5,243,418 A | 9/1993 | Kuno et al. | |
| 5,414,773 A | 5/1995 | Handelman | |
| 5,479,268 A | 12/1995 | Young et al. | |
| 5,526,034 A | 6/1996 | Hoarty et al. | |
| 5,532,754 A | 7/1996 | Young et al. | |
| 5,550,576 A | 8/1996 | Klosterman | |
| 5,550,578 A | 8/1996 | Hoarty et al. | |
| 5,559,549 A * | 9/1996 | Hendricks et al. | 725/50 |
| 5,619,247 A * | 4/1997 | Russo | 725/104 |
| 5,668,591 A * | 9/1997 | Shintani | 725/140 |
| 5,684,525 A | 11/1997 | Klosterman | |
| 5,704,837 A | 1/1998 | Iwasaki et al. | |
| 5,737,028 A | 4/1998 | Bertram et al. | |
| 5,751,282 A | 5/1998 | Girard et al. | |
| 5,818,441 A | 10/1998 | Throckmorton et al. | |
| 5,828,945 A | 10/1998 | Klosterman | |
| 5,841,563 A | 11/1998 | Effenberger | |
| 5,900,915 A | 5/1999 | Morrison | |
| 5,923,362 A | 7/1999 | Klosterman | |
| 5,926,168 A | 7/1999 | Fan | |
| 5,929,849 A | 7/1999 | Kikinis | |
| 5,937,163 A * | 8/1999 | Lee et al. | 709/218 |
| 5,940,073 A | 8/1999 | Klosterman et al. | |
| 5,956,456 A | 9/1999 | Bang et al. | |
| 5,999,167 A | 12/1999 | Marsh et al. | |
| 5,999,187 A | 12/1999 | Dehmlow et al. | |
| 6,029,195 A | 2/2000 | Herz | |
| 6,034,678 A | 3/2000 | Hoarty et al. | |
| 6,061,055 A | 5/2000 | Marks | |

(Continued)

FOREIGN PATENT DOCUMENTS

JP 410093880 A 4/1998

(Continued)

*Primary Examiner*—Dominic D Saltarelli
(74) *Attorney, Agent, or Firm*—Banner & Witcoff, Ltd.

(57) ABSTRACT

A method and apparatus for set top box (STB) receiving a single selection or actuation, and in response to a single selection from a user, transferring a program and auxiliary data related to the program from a first storage device of the STB to a removable storage device.

18 Claims, 3 Drawing Sheets

U.S. PATENT DOCUMENTS

| | | | |
|---|---|---|---|
| 6,072,983 A | 6/2000 | Klosterman | |
| 6,075,575 A | 6/2000 | Schein et al. | |
| 6,078,348 A | 6/2000 | Klosterman et al. | |
| 6,081,271 A | 6/2000 | Bardon et al. | |
| 6,100,883 A | 8/2000 | Hoarty | |
| 6,167,188 A | 12/2000 | Young et al. | |
| 6,205,485 B1 | 3/2001 | Kikinis | |
| 6,205,582 B1 | 3/2001 | Hoarty | |
| 6,233,389 B1 | 5/2001 | Barton et al. | |
| 6,243,039 B1 | 6/2001 | Elliot | |
| 6,271,831 B1 | 8/2001 | Escobosa et al. | |
| 6,816,904 B1 * | 11/2004 | Ludwig et al. | 709/226 |
| 2004/0123333 A1 * | 6/2004 | Nakatsuyama | 725/142 |
| 2004/0128685 A1 * | 7/2004 | Hassell et al. | 725/40 |
| 2004/0168198 A1 * | 8/2004 | Nishioka et al. | 725/112 |
| 2005/0039219 A1 * | 2/2005 | Cooper et al. | 725/134 |

FOREIGN PATENT DOCUMENTS

| | | | |
|---|---|---|---|
| JP | 2000-59717 | * | 2/2000 |
| WO | WO 00/01149 A1 | | 1/2000 |

* cited by examiner

ENHANCED HOME ENTERTAINMENT SYSTEM WITH REMOVABLE LONG-TERM STORAGE

Applicant claims priority to provisional application Ser. No. 60/224,822, filed Aug. 11, 2000, and claims priority to provisional application Ser. No. 60/215,681, filed Jun. 30, 2000, both provisional applications are incorporated herein by reference.

FIELD OF THE INVENTION

The invention is related to the field of home entertainment systems. More specifically, the invention relates to providing an integrated entertainment system.

BACKGROUND OF THE INVENTION

An Electronic Programming Guide (EPG) displays information about programs a viewer is currently watching as well as information about other programs on different channels or at different times. The first EPGs were typically displayed on one channel of a cable television system. These early EPGs were simple, displaying short program descriptions and scrolling past the screen at a predetermined rate. Also, these EPGs typically did not allow for user interaction. More recent digital EPGs allow for the user to interact with the programming schedule, and to view programs while scanning the guide. However, digital EPGs still typically rely on the television as a means of showing the EPG.

FIG. 1 illustrates a typical home entertainment system. Home entertainment system 10 comprises signal input 15, set-top box 20, television based web-browser 25, recording device 30, auxiliary recording device 35, stereo receiver 40, digital versatile disk (DVD) player 45, and television or other video monitor 50.

Entertainment system 10 could have, in addition to the connections shown, networking connections for set-top box 20, web-browser 25, and recording device 30. Many of these devices require either telephone connections or Internet connections in order to program them.

Entertainment system can be difficult for the novice user to set up. Additionally, because the connections between the components are typically analog, the number of connections between input 15 and television 50 can seriously degrade the signal quality.

What is needed is a way to simplify the connections required for an entertainment system, in addition to reducing the amount of signal degradation present in the typical entertainment system.

SUMMARY OF THE INVENTION

The present invention provides a method and apparatus for a set top box (STB) to display an Electronic Programming Guide (EPG) on a display, and in response to a single selection from a user, transferring a program and auxiliary data related to the program from a first storage device of the STB to a removable storage device.

BRIEF DESCRIPTION OF THE DRAWINGS

The present invention is illustrated by way of example and not limitation in the figures of the accompanying drawings, in which.

DETAILED DESCRIPTION

One embodiment provides a method and apparatus for integrating an entertainment system to prevent confusion and signal loss. In the following description, for purposes of explanation, specific details are set forth to provide a thorough understanding of the present invention. However, it will be apparent to one skilled in the art that these specific details are not required in order to practice the present invention.

An EPG allows a user to perform a range of functions that may be useful when watching television. Commonly assigned U.S. patent application Ser. No. 09/488,361, filed Jan. 16, 2000, describes in more detail the functions of an EPG and is hereby incorporated by reference.

The main function of an EPG is to allow a user to view program listings sorted by channel and time. Newer EPGs allow a user to browse through the listings, and to get detailed information about specific programs. EPGs may also allow a user to select certain channels or programs in which the user is particularly interested. Additionally, an EPG may control a recording device, and start recording when programs selected by the user are shown.

Figure 1:
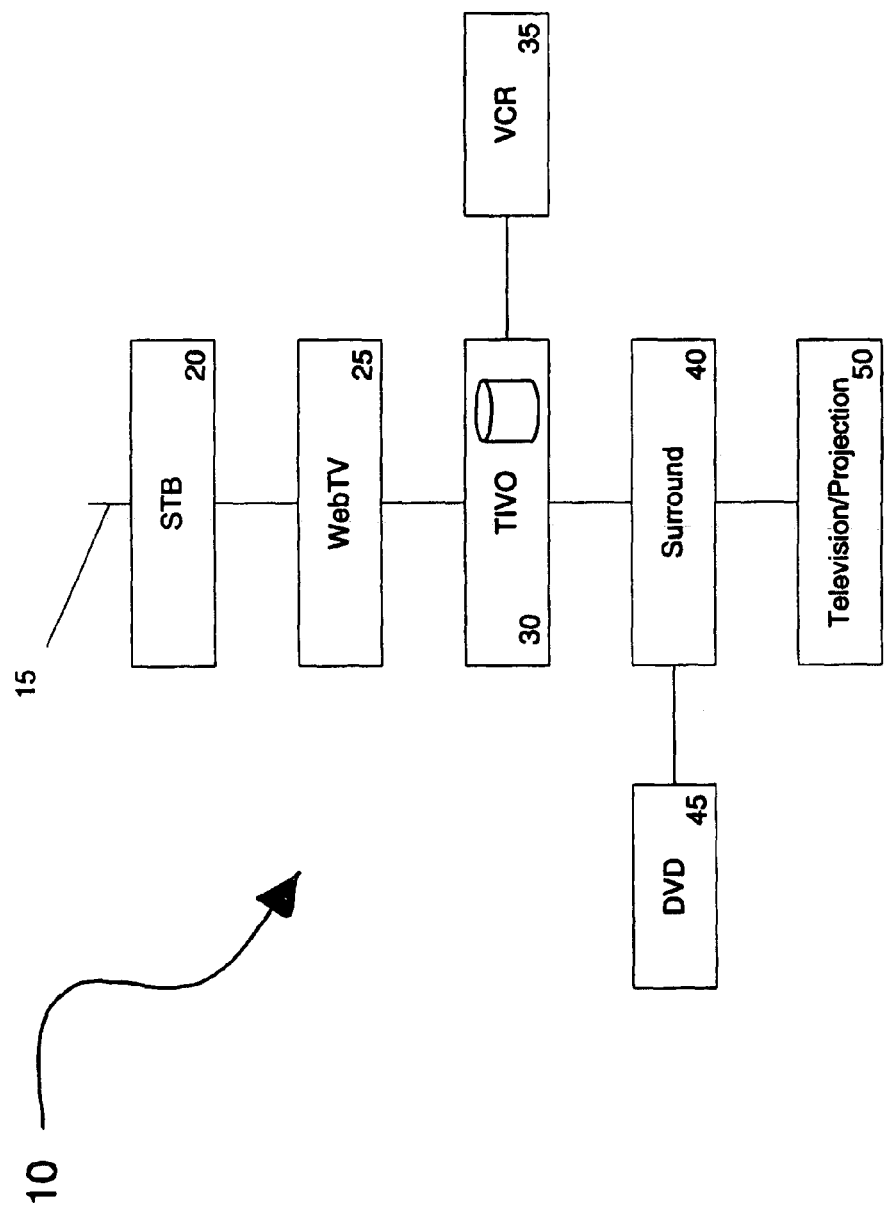
FIG. 1 illustrates a typical entertainment system.
Figure 2:
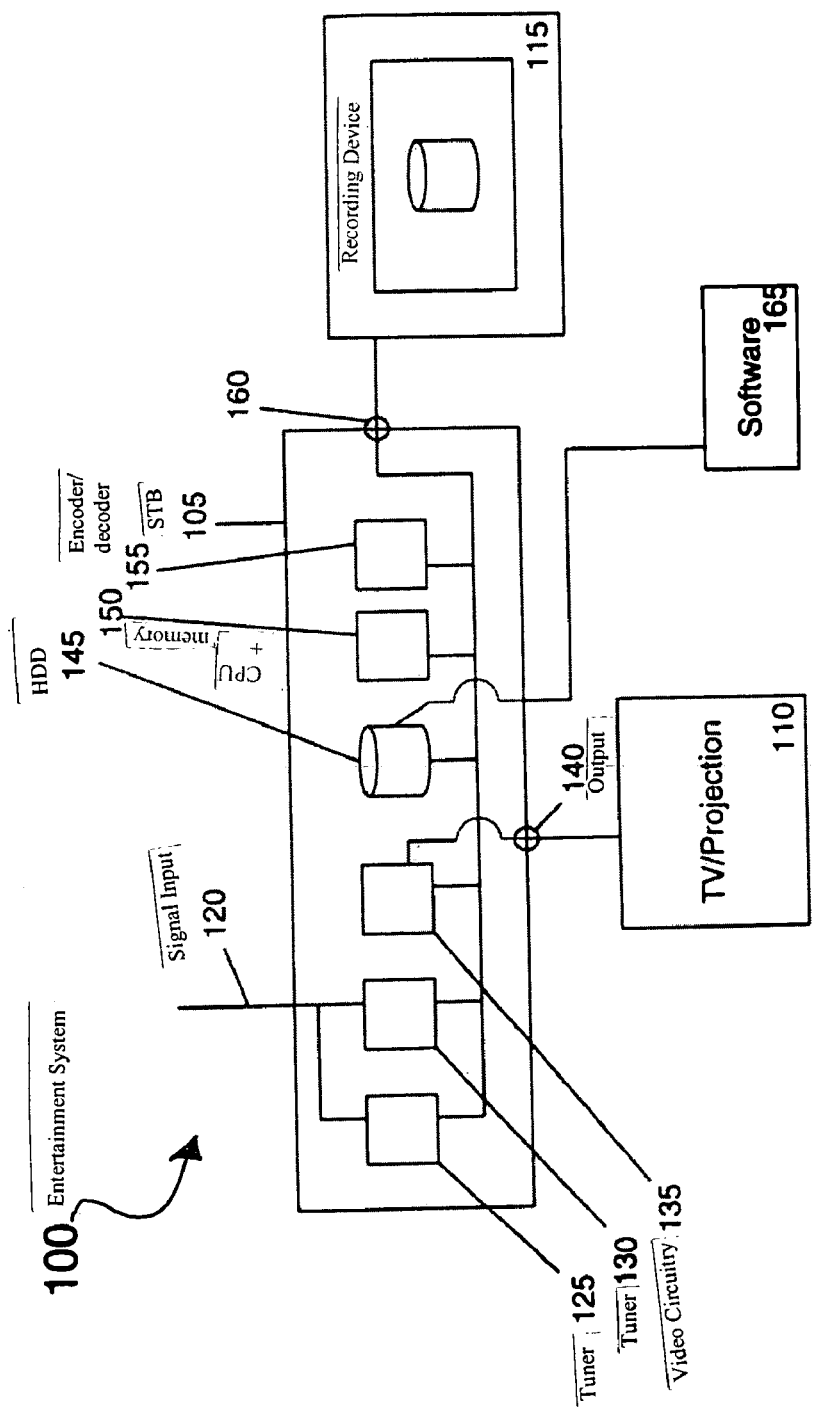
FIG. 2 illustrates an integrated home entertainment system

FIG. 2 illustrates an integrated entertainment system. Current entertainment systems contain many different components. Setting up an entertainment system is typically very difficult, and additionally analog signals that are passed from component to component can significantly degrade.

Entertainment system 100 comprises a set top box (STB) 105, a television or other video display 110, and a digital versatile disc—random access memory (DVD-RAM) drive or other recording device 115. STB 105 processes the signals sent by a service provider, and its function is further described below. Video display 110 displays video signals outputted by STB 105, and may be a television, projection system, plasma screen, liquid crystal display (LCD) or any other device capable of displaying video signals. Recording device 115 can be attached to STB 105 to receive either digital or analog signals, and may be a DVD-RAM drive, a video cassette recorder (VCR), or any other device capable of recording video.

STB 105 further comprises an signal input 120, dual tuners 125 and 130, video circuitry 135, an output port 140, a hard drive 145, a central processing unit (CPU) and memory system 150, an digital video encoder/decoder 155, and a digital input/output port 160. The combination of these devices into STB 105 reduces the complexity of a home entertainment system. STB 105 performs the functions of a typical set top box, a hard drive-based digital recording device, an Internet connectivity device, and may also include hardware to process audio signals. Further, because of the relatively small number of connections within STB 105, signal degradation is significantly reduced. Also, many connections within STB 105 may be or are digital connections, and will not affect the signal in any way.

A signal may be routed into STB 105 using input 120. Signals may be received from any of a number of sources, including cable, satellite and antenna. The signal is then sent to tuners 125 and 130. STB 105 may contain one or more tuners; with two tuners, it is possible to have picture-in-picture (PIP) functionality. Also, one or more tuners may be configured to be a cable modem to facilitate Internet connectivity.

Video circuitry 135 may be either a two dimensional or three dimensional graphics chip for displaying an Electronic Programming Guide (EPG) or other information on video display 110. Signals are sent from video circuitry 135 to video display 110 through output port 140.

Hard drive 145 is capable of storing video encoded by CPU 150 and video encoder/decoder 155. Hard drive 145 further contains operations software 165, which controls the functions of STB 105. Software 165 may also be updated via a network or other means when updates are necessary. Video encoder/decoder 155 may encode and decode digital video using the Moving Picture Experts Group (MPEG) standard or any other method of encoding and decoding digital video. Hard drive 145 may also send data through port 160 to recording device 115.

STB 105 may further include a modem (not shown) to connect to the Internet or other online services. Also, output port 140 may be configured to accept high or medium speed devices, possibly using universal serial bus (USB), parallel, FireWire™, Ethernet or other connections.

Additionally, current hard drive based recording systems, such as TiVo™ and ReplayTV™, make permanent copies of recorded programs by writing to a cassette tape. STB 105 can record to a DVD-RAM, providing a higher-quality and more permanent recording.

STB 105 can also be connected to a stereo or surround-sound receiver. It is also possible to integrate hardware necessary to produce audio and to provide more functionality and integration. DVD-RAM drive 115 may also be integrated into STB 105 if desired. Entertainment system 100 may be controlled by a remote computing device such as computing device 150 (see FIG. 2).

Entertainment system 100 can further provide this functionality without requiring a user to insert blank media or to reconfigure STB 105. A user may instruct STB 105 to record a program. The program will then be recorded to hard drive 145, using video encoder/decoder 155. At a later time, a user can insert a blank media, and instruct STB 105 to record to that blank media. This way, if a user does not have any blank media, or simply does not wish to set up the system at that time, the user may still record the desired program.

Entertainment system 100 can also provide for single-button recording to a digital media. In one embodiment, in response to a user making a single button selection, a selected program and auxiliary information related to the program is transferred from a storage device in the STB to a removable storage device. In one embodiment, the removable storage device may be a DVD-RAM. In alternative embodiment, other types of removable storage devices may be used.

The single button selection may include the selection of a button on a panel of the STB or a panel on a remote control. The remote control may also be a personal digital assistant and/or a web phone.

Recordings made can be sourced out to a spindle farm, a DVD-RAM jukebox or any other massive storage medium. Recordings can be made and organized using the EPG provided to the STB 205. Such methods should be able to store massive amounts of data and a significant amount of video. For example, programs and their related auxiliary data could be indexed by the STB onto the jukebox or other storage device. When a user selects a program that is stored on a removable storage, the STB would prompt the user to insert the removable storage containing the selected program.

Several alternative embodiments of entertainment system 100 exist. Video encoding and decoding can be performed by software stored on hard drive 145 and processed in CPU 150. Or, a combination of software and hardware instruction for encoding and decoding video is possible. Also, many different types of recording media can be used, such as: optical, magnetic, laser magnetic, tape, cartridge, or flash random access memory (RAM).

Figure 3:
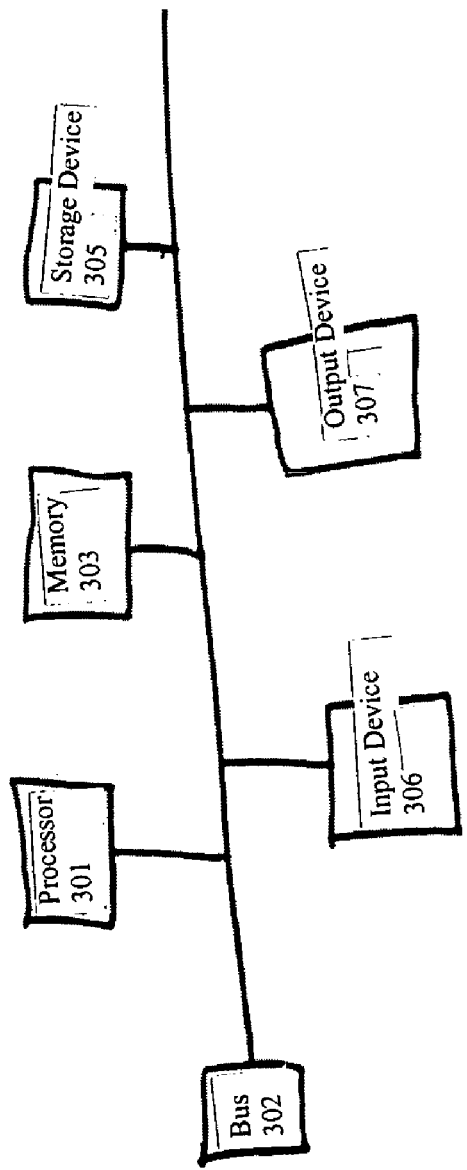
FIG. 3 is one example of a computer system according to an embodiment of the present invention.

The system and method described herein may be integrated into advanced Internet-or network-based knowledge systems as related to information retrieval, information extraction, and question and answer systems. FIG. 3 is an example of one embodiment of a computer system 300. The system shown has a processor 301 coupled to a bus 302. Also shown coupled to the bus 302 is a memory 303 which may contain instructions to perform the method described herein. Additional components shown coupled to the bus 302 are a storage device 305 (such as a hard drive, floppy drive, CD-ROM, DVD-ROM, etc.), an input device 306 (such as a keyboard, mouse, light pen, barcode reader, scanner, microphone, joystick, etc.), and an output device 307 (such as a printer, monitor, speakers, etc.). Of course, an exemplary computer system could have more components than these or a subset of the components listed.

The system and method described herein may be stored in the memory of a computer system (i.e., a set-top box) as a set of instructions to be executed, as shown by way of example in FIG. 3. In addition, the instructions to perform the system and method described herein may alternatively be stored on other forms of machine-readable media, including magnetic and optical disks. For example, the system and method of the present invention may be stored on machine-readable media, such as magnetic disks or optical disks, which are accessible via a disk drive (or computer-readable medium drive). Further, the instructions may be downloaded into a computing device over a data network in the form of a compiled and linked version.

Alternatively, the logic to perform the system and method described herein may be implemented in additional computer and/or machine-readable media such as discrete hardware components as large-scale integrated circuits (LSI's), application specific integrated circuits (ASIC's), and firmware such as electrically erasable programmable read-only memory (EEPROM's).

The embodiments above have been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the embodiments as claimed. Accordingly, the scope is defined by the appended claims rather than the forgoing descriptions of embodiments.

What is claimed is:

1. A method comprising:

receiving, by a content rendering system, a command to record a program;

determining whether a second storage device is available, wherein the second storage device is separate from the content rendering system;

in response to determining that the second storage device is unavailable, automatically recording the program to a first storage device:

displaying an electronic programming guide comprising a listing of one or more programs including the recorded program;

receiving, by the content rendering system, input corresponding to an actuation of a command selecting the recorded program from the listing of one or more programs, the actuation including a single pressing of a selected portion of a control device; and automatically transferring the recorded program from the first storage device in the content rendering system to the second storage device in response to the selection of the recorded program from the listing of one or more programs in the electronic programming guide, wherein the second storage device is removable.

2. The method of claim 1, further including, in response to a second input corresponding to a second actuation of a second command, transferring the program from the second storage device to the first storage device of the content rendering system, wherein the second actuation corresponds to a pressing of a second portion of at least one of: a control panel of the content rendering system, a remote control device associated with the content rendering system, and a web phone.

3. The method of claim 2, further including maintaining an index of programs and related auxiliary data transferred from the first storage device to the second storage device.

4. The method of claim 3, wherein the method further includes, in response to the selection of the recorded program, the content rendering system prompting for the insertion of the removable storage device into the content rendering system.

5. The method of claim 4, wherein the removable storage device is a DVD-RAM.

6. The method of claim 2, wherein the second actuation corresponds to a single pressing of a transfer function button on at least one of the control panel of the content rendering system and the remote control device.

7. The method of claim 2, wherein the first portion and the second portion are the same portion.

8. A non-transitory computer readable medium encoded with instructions, which when executed causes a content rendering system to:
receive a command to record a program;
determine whether a second storage device is available, wherein the second storage device is separate from the content rendering system:
in response to determining that the second storage device is unavailable, automatically record the program to a first storage device;
display an electronic programming guide comprising a listing of one or more programs including the recorded program;
receive, by the content rendering system, input corresponding to an actuation of a command selecting the recorded program from the listing of one or more programs, the actuation including a single pressing of a selected portion of a control device; and
automatically transfer the recorded program from the first storage device in the content rendering system to the second storage device in response to the selection of the recorded program from the listing of one or more programs in the electronic programming guide, wherein the second storage device is removable.

9. The computer readable medium of claim 8, further including, in response to a second actuation of a second command, transferring the program from the second storage device to the first storage device of the content rendering system, wherein the second actuation corresponds to a pressing of a second portion of at least one of: a control panel of the content rendering system, a remote control device associated with the content rendering system, and a web phone.

10. The computer readable medium of claim 9, further including maintaining an index of programs and related auxiliary data transferred from the first storage device to the second storage device.

11. The computer readable medium of claim 10, wherein the method further includes, in response to the selection of the program, the content rendering system prompting for insertion of the removable storage device into the content rendering system.

12. The computer readable medium of claim 11, wherein the removable storage device is a DVD-RAM.

13. An apparatus comprising:
a processor; and
memory operatively coupled to the processor and storing instructions that, when executed, cause the apparatus to:
receive, by a content rendering system, a command to record a program;
determine whether a second storage device is available, wherein the second storage device is separate from the content rendering system;
in response to determining that the second storage device is unavailable, automatically recording the program to a first storage device;
display an electronic programming guide comprising a listing of one or more programs including the recorded program:
receive, by the content rendering system, input corresponding to an actuation of a command selecting the recorded program from the listing of one or more programs, the actuation including a single pressing of a selected portion of a control device; and
automatically transfer the recorded program from the first storage device in the content rendering system to the second storage device in response to the selection of the recorded program from the listing of one or more programs in the electronic programming guide, wherein the second storage device is removable.

14. The apparatus of claim 13, wherein the computer readable instructions, when executed, further cause the apparatus to transfer the program from the second storage device to the first storage device of the content rendering system in response to a second actuation of a second command, wherein the second actuation corresponds to a pressing of a second portion of at least one of: a control panel of the content rendering system, a remote control device associated with the content rendering system, and a web phone.

15. The apparatus of claim 14, further including an index unit configured to maintain an index of programs and related auxiliary data transferred from the first storage device to the second storage device.

16. The apparatus of claim 15, further comprising a unit configured to prompt for an insertion of the removable storage device into the content rendering system in response to the selection of the program.

17. The apparatus of claim 16, wherein the removable storage device is a DVD-RAM.

18. The apparatus of claim 13, wherein the content rendering system includes:
a tuner;
a signal input;
a storage medium;
a processor;
a digital video encoder and decoder; and
a digital output port.

* * * * *